(12) United States Patent
Ahn (10) Patent No.: US 9,219,288 B2
(45) Date of Patent: Dec. 22, 2015

(54) SECONDARY BATTERY

(75) Inventor: Chang-Bum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 449 days.

(21) Appl. No.: 12/965,767

(22) Filed: Dec. 10, 2010

(65) Prior Publication Data

US 2011/0165452 A1    Jul. 7, 2011

Related U.S. Application Data (60) Provisional application No. 61/292,445, filed on Jan. 5, 2010.

(51) Int. Cl.
| | | |
|---|---|---|
| *H01M 10/36* | (2010.01) | |
| *H01M 10/04* | (2006.01) | |
| *H01M 10/42* | (2006.01) | |
| *H01M 10/052* | (2010.01) | |

(52) U.S. Cl.
CPC ............ *H01M 10/04* (2013.01); *H01M 10/42* (2013.01); *H01M 10/4257* (2013.01); *H01M 10/0472* (2013.01); *H01M 10/052* (2013.01)

(58) Field of Classification Search
CPC ............ H01M 10/04; H01M 10/0472; H01M 10/052; H01M 10/42; H01M 10/4257; H01M 4/0421; H01M 4/0423; H01M 4/0426
See application file for complete search history.

(56) References Cited

U.S. PATENT DOCUMENTS

| | | | | |
|---|---|---|---|---|
| 6,264,709 B1 * | 7/2001 | Yoon et al. | ............ | 29/623.5 |
| 6,284,406 B1 * | 9/2001 | Xing et al. | ........... | 429/96 |
| 6,387,566 B1 | 5/2002 | Chang et al. | | |
| 6,451,474 B1 * | 9/2002 | Kozu et al. | ............ | 429/100 |
| 6,805,998 B2 * | 10/2004 | Jenson et al. | ......... | 429/162 |
| 2001/0033952 A1 | 10/2001 | Jenson et al. | | |
| 2004/0081860 A1 * | 4/2004 | Hundt et al. | .......... | 429/7 |
| 2004/0214079 A1 * | 10/2004 | Simburger et al. | ..... | 429/123 |
| 2005/0263596 A1 * | 12/2005 | Nelson et al. | ......... | 235/441 |
| 2006/0035141 A1 | 2/2006 | Lee | | |

FOREIGN PATENT DOCUMENTS

| | | |
|---|---|---|
| CN | 1713444 A | 12/2005 |
| CN | 101335363 A | 12/2008 |
| EP | 1 970 722 A2 | 9/2008 |
| JP | 05-114392 | 5/1993 |
| JP | 07-307145 | 11/1995 |
| JP | 2000-299101 | 10/2000 |
| JP | 2002-313314 A | 10/2002 |

(Continued)

OTHER PUBLICATIONS

Machine translation of JP 05-114392, published Jul. 5, 1993.*

(Continued)

*Primary Examiner* — Carlos Barcena
*Assistant Examiner* — Lilia V Nedialkova
(74) *Attorney, Agent, or Firm* — Christie, Parker & Hale, LLP (57) ABSTRACT

A secondary battery includes a circuit board including a first connection pad and a second connection pad; a first electrode layer on the circuit board and including a first electrode portion and a first tab portion connected to the first connection pad; a separator on the first electrode layer; and a second electrode layer on the separator and including a second electrode portion and a second tab portion connected to the second connection pad.

18 Claims, 8 Drawing Sheets

(56) References Cited

FOREIGN PATENT DOCUMENTS

| JP | 2005-010859 | 1/2005 |
|---|---|---|
| JP | 2006-12769 | 1/2006 |
| JP | 2008-123816 | 5/2008 |
| JP | 2011-23333 | 2/2011 |

OTHER PUBLICATIONS

Extended European Search Report dated Mar. 30, 2011, issued in EP Application No. 10196891.5, 9 pages.

SIPO Office action dated Mar. 19, 2013, with English translation, corresponding to Chinese Patent application 201110006368.5, (16 pages).

English translation of Japan Office Action for corresponding Japanese Patent application No. 2011-000168, dated Nov. 20, 2012 (6 pgs.).

English translation of Korean Office action dated May 4, 2012 for Application No. 10-2010-0129279 (4 pgs.).

English translation of KIPO Notice of Allowance dated Nov. 7, 2012 for corresponding Korean Patent Application No. 10-2010-0129279 (1 pg.).

SIPO Office action dated Nov. 18, 2013, for corresponding Chinese Patent application 201110006368.5 (5 pages), and English Translation (6 pages).

\* cited by examiner

SECONDARY BATTERY

CROSS-REFERENCE TO RELATED APPLICATION

This application claims priority to and the benefit of U.S. Provisional Patent Application No. 61/292,445, filed on Jan. 5, 2010 in the United States Patent and Trademark Office, the entire content of which is incorporated herein by reference.

BACKGROUND

1. Field

Aspects of embodiments of the present invention relate to a secondary battery, and more particularly, to a secondary battery having a reduced thickness.

2. Description of the Related Art

As representative rechargeable secondary batteries, lithium (Li) secondary batteries have a high operational voltage and energy density per unit weight as compared with nickel-cadmium (Ni—Cd) or nickel-hydrogen (Ni-MH) secondary batteries. Hence, their uses have been increased.

As the use of portable electronic devices increases, the use of secondary batteries increases. Studies for reducing the size and thickness of secondary batteries have been conducted based on user's demands.

Currently, a memory unit for storing information and a process unit for processing information are embedded into a smart card. To this end, a technology for embedding a battery into a smart card has been developed.

In Japanese Patent Laid-Open Publication No. 2005-10859 (published on Jan. 13, 2005), there has been disclosed a thin-film integrated circuit (IC) card into which a secondary battery such as a capacitor or lithium secondary battery, sealed by a case, is embedded not to overlap with an IC module.

A need exists for the thickness of secondary batteries to be decreased so that smart cards may be manufactured to have a size suitable for international standards.

SUMMARY

An aspect of embodiments of the present invention provides a secondary battery having a minimized or reduced thickness.

According to one embodiment of the present invention, a secondary battery includes: a circuit board including a first connection pad and a second connection pad; a first electrode layer on the circuit board and including a first electrode portion and a first tab portion connected to the first connection pad; a separator on the first electrode layer; and a second electrode layer on the separator and including a second electrode portion and a second tab portion connected to the second connection pad.

In one embodiment, the circuit board is configured as a case of the secondary battery. In one embodiment, a secondary battery further includes a case containing the circuit board, the first electrode layer, the separator, and the second electrode layer. The case may include a first portion on a first side of the circuit board and a second portion on a second side of the circuit board opposite the first side, and the first and second portions may be coupled to one another at respective edge portions thereof for sealing the case. The case may include a flexible resin. In one embodiment, a secondary battery further includes first and second terminals connected to the first and second electrode layers, respectively, proximate the respective first and second connection pads, the first and second terminals being exposed outside the case.

The circuit board may include a flexible printed circuit board (FPCB). In one embodiment, a secondary battery may further include an insulating film or an insulating layer on an outer surface of the second electrode layer. The insulating film or the insulating layer may seal sides of the circuit board. In one embodiment, a secondary battery further includes a cover plate on the second electrode layer. The cover plate may seal sides of the circuit board.

In one embodiment, the first and second connection pads are on a surface of the circuit board, and a stacked assembly including the first electrode layer, the separator, and the second electrode layer is stacked on the surface of the circuit board. The circuit board may further include a protection layer on the surface of the circuit board, and the first and second tab portions may be connected to the first and second connection pads, respectively, through first and second openings through the protection layer. The protection layer may coat the surface of the circuit board other than the first and second openings. The circuit board may further include an insulating film or an insulating layer on another surface of the circuit board opposite the surface of the circuit board.

In one embodiment, a circuit board further includes an integrated circuit electrically connected to the first and second connection pads. The integrated circuit may include a storage unit configured to store information, a receiving unit configured to receive input signals, a transmitting unit configured to transmit output signals, and a processing unit configured to process signals. The first electrode portion may overlap the integrated circuit, and the second electrode portion may overlap the first electrode portion. In one embodiment, the separator has a width that is greater than a corresponding width of the first electrode layer.

According to another embodiment of the present invention, a smart card includes: a circuit board including a first connection pad, a second connection pad, and an integrated circuit electrically connected to the first and second connection pads; a first electrode layer on the circuit board and including a first electrode portion and a first tab portion connected to the first connection pad; a separator on the first electrode layer; a second electrode layer on the separator and including a second electrode portion and a second tab portion connected to the second connection pad; and a case containing the circuit board, the first electrode layer, the separator, and the second electrode layer, wherein the integrated circuit includes a storage unit configured to store information, a receiving unit configured to receive input signals, a transmitting unit configured to transmit output signals, and a processing unit configured to process signals.

According to another embodiment of the present invention, a secondary battery includes a circuit board; a positive electrode layer formed on the circuit board, the positive electrode layer being connected to a pad portion on the circuit board; a negative electrode layer disposed opposite to the positive electrode layer, the negative electrode layer being connected to a pad portion on the circuit board; and a separator interposed between the positive and negative electrode layers.

The circuit board may include a protection circuit and the pad portions connected to the circuit board, and the surface of the circuit board may be coated with a protection layer.

According to another embodiment of the present invention, a smart card includes a circuit board having an integrated circuit (IC) module; a positive electrode layer formed on the circuit board, the positive electrode layer being connected to a pad portion on the circuit board; a negative electrode layer disposed opposite to the positive electrode layer, the negative electrode layer being connected to a pad portion on the circuit board; a separator interposed between the positive and negative electrode layers; and a case having terminals respectively connected to the positive and negative electrode layers, the terminals being exposed to the exterior of the case.

The circuit board may include a circuit interconnection connected to the circuit board, and the pad portions connected to the circuit interconnection. The entire surface of the circuit board having the IC module may be coated with a protection layer.

The positive electrode layer may be formed on the protection layer and connected to the pad portion through an opening formed in the protection layer.

The positive electrode layer may be made of a positive electrode active material. The positive electrode active material may made of a mixture of a lithium-based oxide, a binder, and a conducting material, and the conducting material may be mixed at a rate of about 10 to 40%.

The negative electrode layer may be made of a negative electrode active material. The negative electrode active material may be made of a mixture of a material containing carbon, a binder, and a conducting material.

The separator may be formed with a fiber non-woven fabric including resin such as polyethylene, polypropylene, or polyolefin, a mixture thereof, or one or more selected from the group consisting of cellulose, polyester, and polypropylene. An ethylene carbonate (EC)-based or propylene carbonate (PC)-based electrolyte may be contained in the separator.

The IC module may include a storage unit for storing information; a receiving unit for receiving signals from the exterior of the IC module; a transmitting unit for transmitting signals to the exterior of the IC module; and a processing unit for processing information stored in the storage unit to transmit the processed information to the transmitting unit.

The case may include a flexible resin. The flexible resin may include at least one selected from the group consisting of nylon, polyvinyl chloride (PVC), polyethylene, acrylonitrile butadiene styrene (ABS), polyethylene terephthalate (PET), polyethylene terephthalate-G (PET-G), and polytetrafluoroethylene (PTFE).

The circuit board, the positive electrode layer, the separator, and the negative electrode layer may be sealed by the case. A tab portion of the positive electrode layer and a tab portion of the negative electrode layer may be connected to the terminals by compression, respectively.

Another aspect of embodiments of the present invention provides a secondary battery having a stacked assembly of a positive electrode active material, a separator, and a negative electrode active material directly formed on a circuit board, so that the circuit board can be used as a case, and the thickness of the secondary battery can be minimized or reduced.

Another aspect of embodiments of the present invention provides a smart card having a secondary battery such that information storage and processing are performed in the smart card itself, wherein the secondary battery is formed into a stacked assembly of a positive electrode active material, a separator, and a negative electrode active material, and the stacked assembly is in direct contact with the circuit board, thereby minimizing or reducing the thickness of the smart card.

BRIEF DESCRIPTION OF THE DRAWINGS

The accompanying drawings, together with the specification, illustrate some exemplary embodiments of the present invention, and, together with the description, serve to explain the principles of the present invention.

DETAILED DESCRIPTION

In the following detailed description, certain exemplary embodiments of the present invention have been shown and described by way of illustration. As those skilled in the art would realize, the described embodiments may be modified in various ways, all without departing from the spirit or scope of the present invention. Accordingly, the drawings and description herein are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 1A:
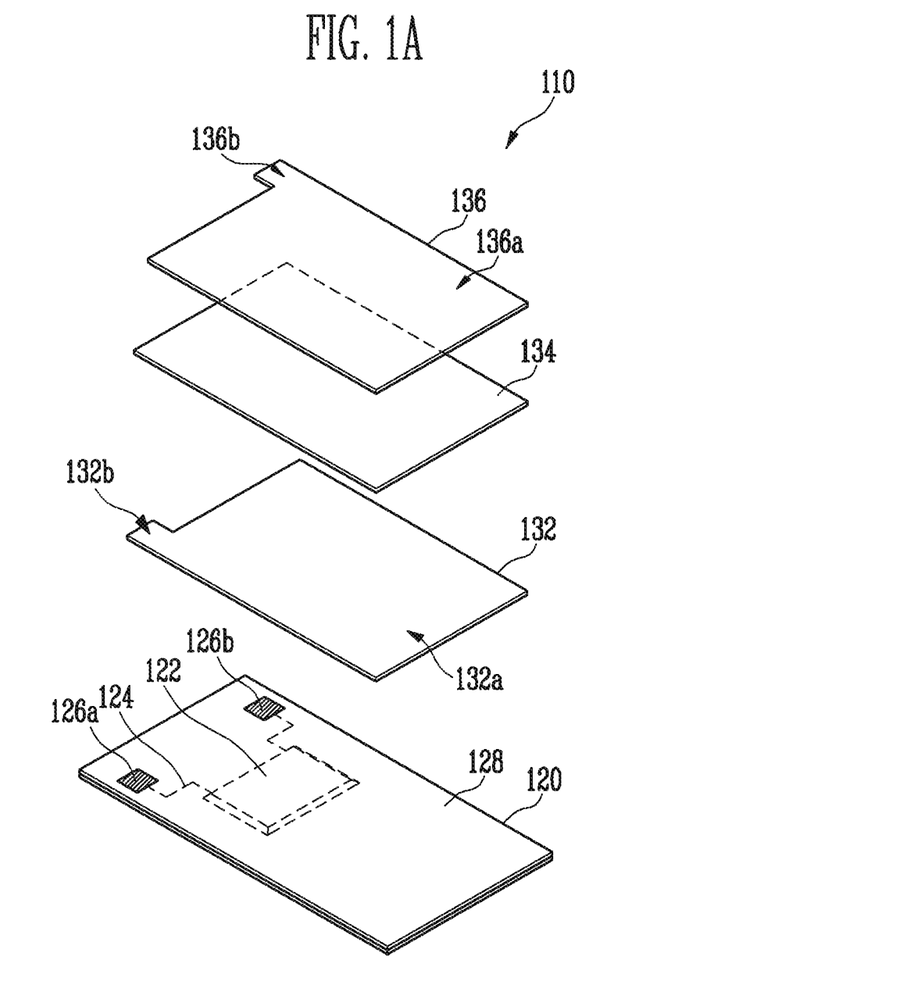
FIG. 1A is an exploded perspective view of a secondary battery according to an embodiment of the present invention.

FIG. 1A is an exploded perspective view of a secondary battery according to an embodiment of the present invention.

Referring to FIG. 1A, a secondary battery 110, in one embodiment, includes a circuit board 120 having a protection circuit 122; a positive electrode layer 132 formed on the circuit board 120 and connected to a pad portion 126a on the circuit board 120; a negative electrode layer 136 disposed on a side of the positive electrode layer 132 opposite the circuit board 120 and connected to a pad portion 126b on the circuit board 120; and a separator 134 interposed between the positive and negative electrode layers 132 and 136.

The circuit board 120, in one embodiment, has a form of a thin film, such as a flexible printed circuit board. In one embodiment, on the circuit board 120 are formed a circuit interconnection 124 and the pad portions 126a and 126b connected to the circuit interconnection 124. Further, in one embodiment, the protection circuit 122 is connected to the circuit interconnection 124. The surface of the circuit board 120, in one embodiment, is coated with a protection layer 128, and the pad portions 126a and 126b are exposed to the exterior of the circuit board 120 through respective openings formed in the protection layer 128.

In one embodiment, the positive electrode layer 132 is formed to have, for example, a thickness of about 10 to 30 μm on the circuit board 120. The positive electrode layer 132, in one embodiment, includes an electrode portion 132a and a tab portion 132b protruded from the electrode portion 132a. The tab portion 132b, in one embodiment, is connected to the exposed pad portion 126a, so that the positive electrode layer 132 is connected to the circuit board 120.

The positive electrode layer 132 may be formed of a positive electrode active material using, for example, a spray, coating, or deposition method. In one embodiment, lithium-based oxides, such as lithium cobalt oxide ($LiCoO_2$), lithium nickel oxide ($LiNiO_2$), and lithium manganese oxide ($LiMn_2O_4$), may be used as the positive electrode active material. In one embodiment, a binder and/or a conducting material is mixed with the positive electrode active material.

In one embodiment, the positive electrode layer 132 does not include a positive electrode collector made of a metal such as aluminum (Al). Hence, in order to provide sufficient conductivity, the conducting material, in one embodiment, is mixed in the positive electrode active material at a rate of about 10% or greater (e.g., in a ratio of about 10% to about 40%).

The separator 134, in one embodiment, has, for example, a thickness of about 3 to 10 μm on the positive electrode layer 132. In one embodiment, for preventing or substantially preventing a short circuit between the positive and negative electrode layers 132 and 136, the width of the separator 134 is wider than that of the positive electrode layer 132, such as to surround sidewalls of the electrode portion 132a of the positive electrode layer 132.

The separator 134, in one embodiment, includes a porous insulating material through which lithium ions can pass. The separator 134, for example, may be formed with a fiber non-woven fabric including resin such as polyethylene, polypropylene, polyolefin, a mixture thereof, or one or more selected from the group consisting of cellulose, polyester, and polypropylene.

An ethylene carbonate (EC)-based or propylene carbonate (PC)-based electrolyte may be contained in the separator 134. For example, an electrolyte may be penetrated into the separator 134 by dipping the separator 134 in the electrolyte.

The negative electrode layer 136, in one embodiment, has, for example, a thickness of about 10 to 30 μm on the separator 134. The negative electrode layer 136, in one embodiment, includes an electrode portion 136a and a tab portion 136b protruded from the electrode portion 136a. The tab portion 136b, in one embodiment, is connected to the exposed pad portion 126b, so that the negative electrode layer 136 is connected to the circuit board 120. In one embodiment, the electrode portion 136a of the negative electrode layer 136 is disposed to overlap the electrode portion 132a of the positive electrode layer 132. The tab portion 136b of the negative electrode layer 136 is disposed at a different position from that of the tab portion 132b of the positive electrode layer 132 and does not overlap with the tab portion 132b of the positive electrode layer 132.

The negative electrode layer 136 may be formed of a negative electrode active material using, for example, a spray, coating, or deposition method. In one embodiment, coke-based or graphite-based carbon may be used as the negative electrode active material. In one embodiment, a binder and/or a conducting material may be mixed with the negative electrode active material.

According to an aspect of the secondary battery 110, a stacked assembly of the positive electrode layer 132, the separator 134, and the negative electrode layer 136 is directly formed on the circuit board 120, such that the circuit board 120 can function as a case, and the thickness of the secondary battery 110 can be minimized or reduced.

Figure 1B:
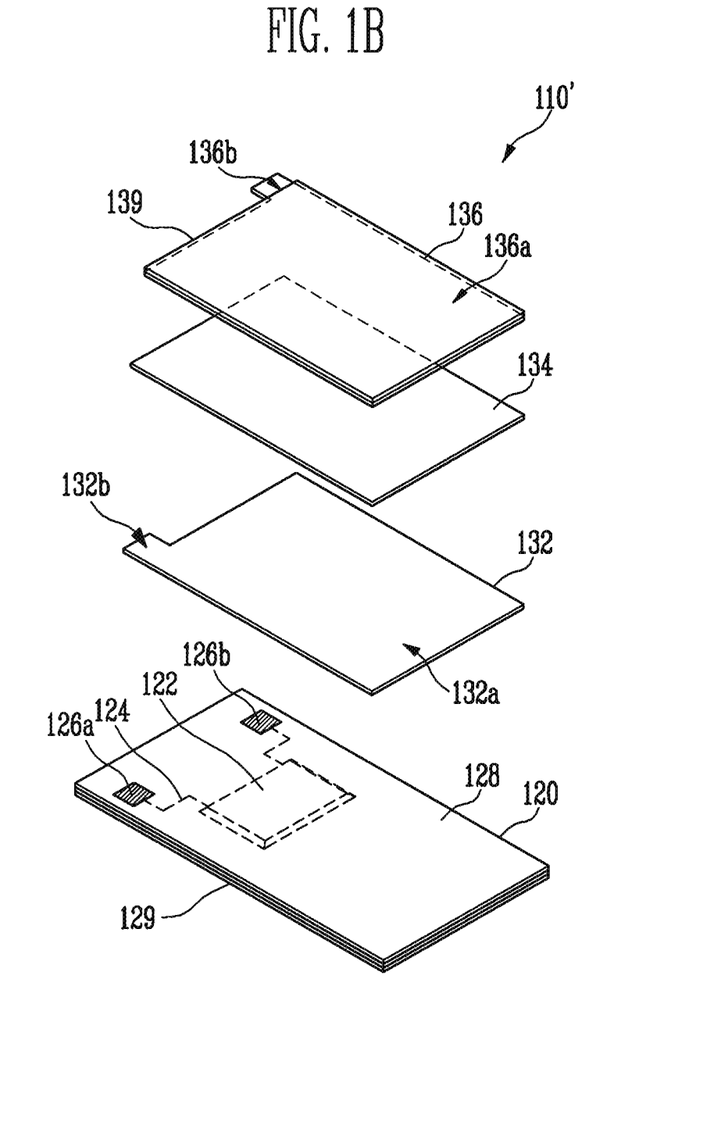
FIG. 1B is an exploded perspective view of a secondary battery according to another embodiment of the present invention.

Referring to FIG. 1B, a secondary battery 110', in one embodiment, includes a circuit board 120 having a protection circuit 122; a positive electrode layer 132 formed on the circuit board 120 and connected to a pad portion 126a on the circuit board 120; a negative electrode layer 136 disposed on a side of the positive electrode layer 132 opposite the circuit board 120 and connected to a pad portion 126b on the circuit board 120; and a separator 134 interposed between the positive and negative electrode layers 132 and 136. The secondary battery 110' is similar to the secondary battery 110 described above and shown in FIG. 1A and, therefore, the description of like components will be omitted. The secondary battery 110' further includes an insulating layer 129 on a side of the circuit board 120 opposite the protection layer 128 (e.g., an outer surface of the secondary battery 110') and an insulating layer 139 on a side of the negative electrode layer 136 opposite the separator 134. The insulating layers 129 and 139 may include a film, coating, cover plate, or any other suitable insulating layer. In one embodiment, at least one of the insulating layers 129 and 139 may seal sidewalls of the circuit board 120.

Figure 2:
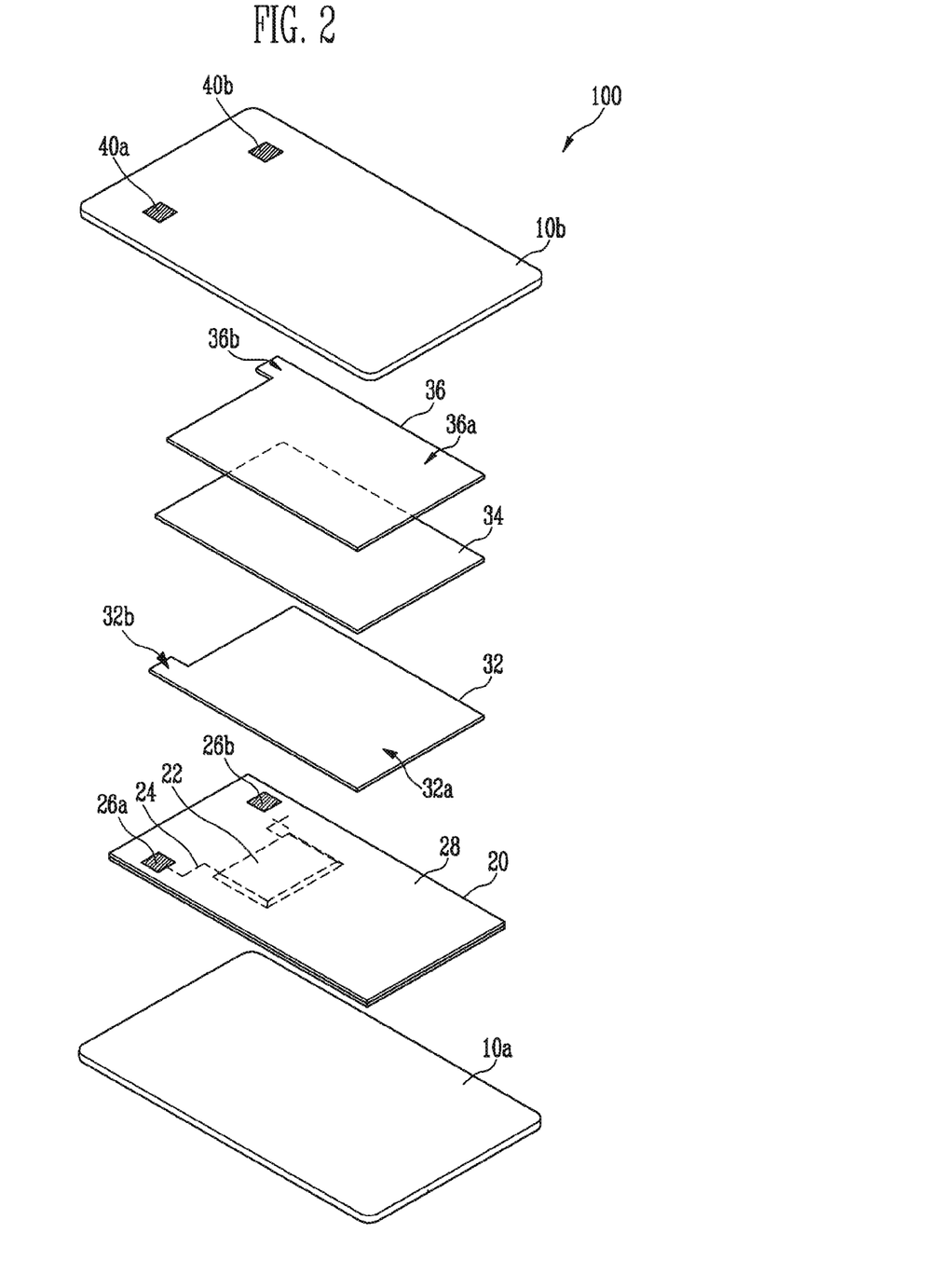
FIG. 2 is an exploded perspective view of a secondary battery according to another embodiment of the present invention.
Figure 5A:
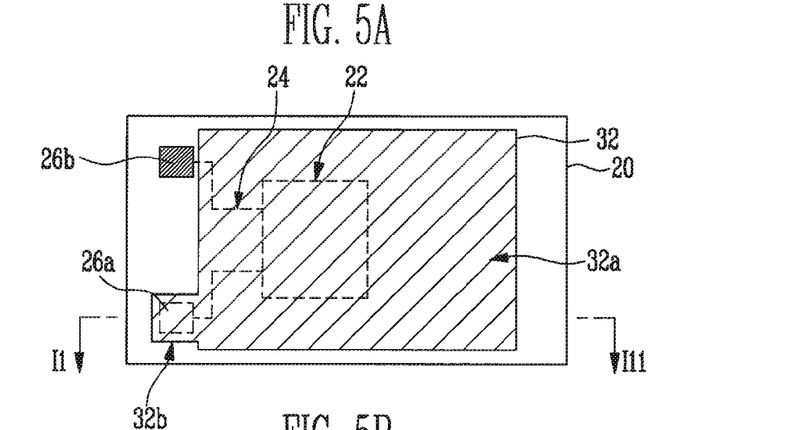
FIGS. 5A to 5C are plan views illustrating a stacked structure of the secondary battery of FIG. 2.
Figure 5B:
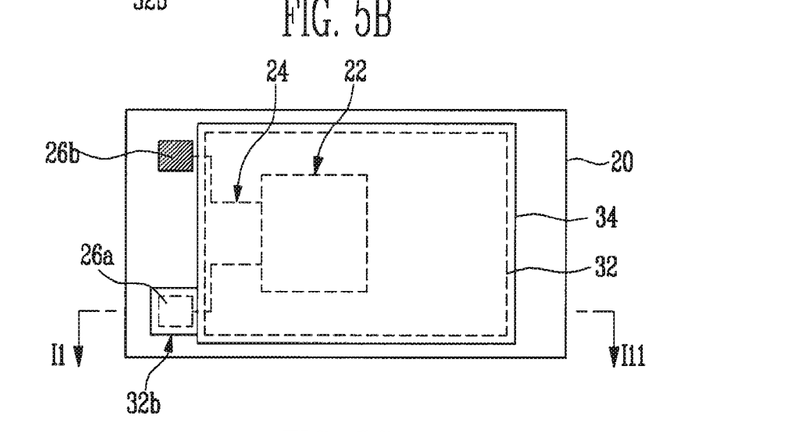
Figure 5C:
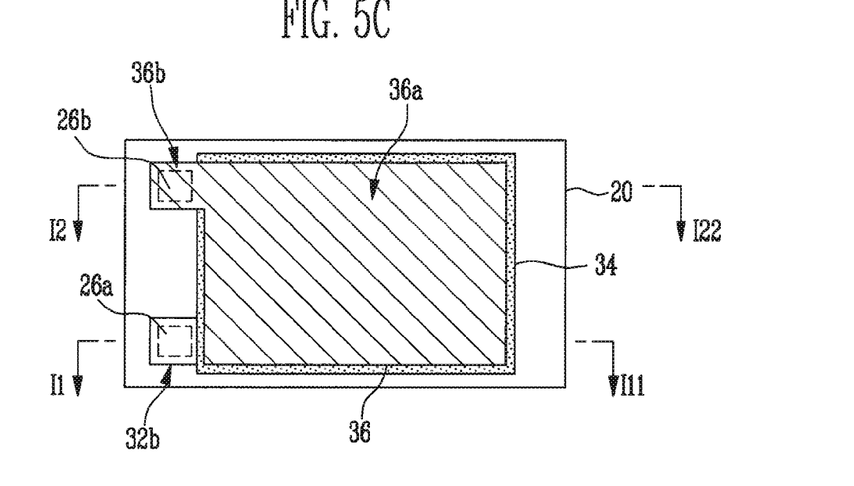

FIG. 2 is an exploded perspective view of a secondary battery according to another embodiment of the present invention. FIGS. 5A to 5C are plan views and FIGS. 6A to 6D are sectional views illustrating a stacked structure of the secondary battery of FIG. 2.

Referring to FIG. 2, a secondary battery 100, in one embodiment, includes a circuit board 20 having an integrated circuit (IC) module 22; a positive electrode layer 32 formed on the circuit board 20 and connected to a pad portion 26a on the circuit board 20; a negative electrode layer 36 disposed on a side of the positive electrode layer 32 opposite the circuit board 20 and connected to a pad portion 26b on the circuit board 20; a separator 34 interposed between the positive and negative electrode layers 32 and 36; and a case 10a and 10b having terminals 40a and 40b respectively connected to the positive and negative electrode layers 32 and 36 and exposed to the exterior thereof.

Figure 3:
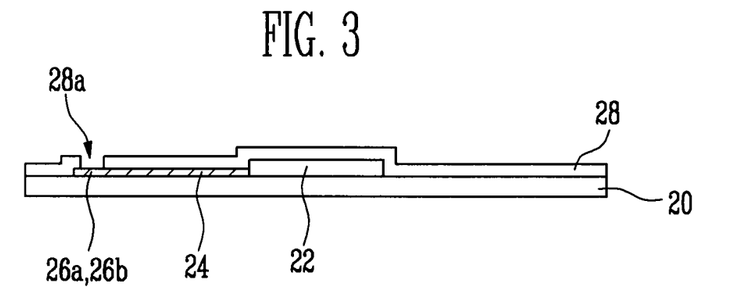
FIG. 3 is a sectional view illustrating a circuit board of the secondary battery of FIG. 2.

Referring to FIGS. 2 and 3, the circuit board 20, in one embodiment, has a form of a thin film, such as a flexible printed circuit board. On the circuit board 20, in one embodiment, are formed a circuit interconnection 24 and the pad portions 26a and 26b connected to the circuit interconnection 24. The IC module 22 is connected to the circuit interconnection 24.

Figure 4:
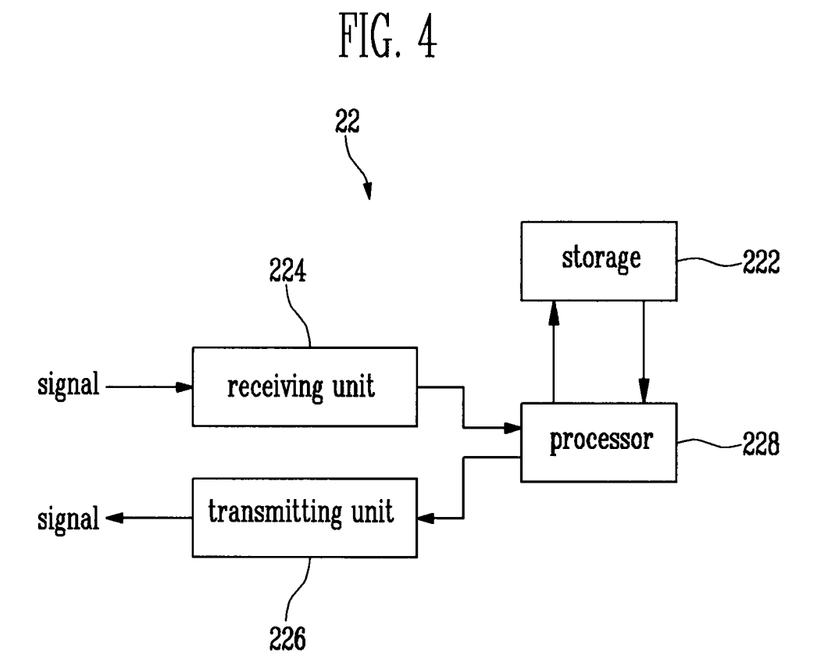
FIG. 4 is a block diagram of an integrated circuit module of the circuit board of FIG. 3.

Referring to FIG. 4, the IC module 22, in one embodiment, includes a storage unit 222 for storing information; a receiving unit 224 for receiving signals from the exterior of the IC module 22; a transmitting unit 226 for transmitting signals to the exterior of the IC module 22; and a processing unit 228. The processing unit 228, in one embodiment, is configured to process signals received from the receiving unit 224 to store information obtained from the processed signals in the storage unit 222, and to process the information stored in the storage unit 222 to provide the processed information to the transmitting unit 226.

The storage unit 222, in one embodiment, includes a memory device for storing information, and the processing unit 228, in one embodiment, includes a central processing unit (CPU) for processing information. The secondary battery 100 including the IC module 22 according to embodiments of the present invention provides a smart card. For example, in the case of a contact smart card, each of the receiving and transmitting units 224 and 226 may have a contact portion (not shown) for communication with a card reader. In the case of a non-contact smart card, each of the receiving and transmitting units 224 and 226 may have a coil-shaped antenna (not shown).

In one embodiment, an insulative protection layer 28 is formed on the entire surface of the circuit board 20 having the IC module 22, and the pad portions 26a and 26b are exposed to the exterior of the circuit board 20 through respective openings 28a (see FIG. 3) formed on the protection layer 28. The protection layer 28, in one embodiment, is formed of polyethylene (PE), polypropylene (PP), or any other suitable insulative layer.

Although it is described above with reference to FIG. 4 that the IC module 22 is configured as having the storage unit 222, the receiving unit 224, the transmitting unit 226, and the processing unit 228, the present invention is not limited thereto, and, in other embodiments, the IC module 22 may have any other suitable configuration capable of storing a user's information and performing information processing, such as calculation and communicating with a card reader.

Figure 6A:
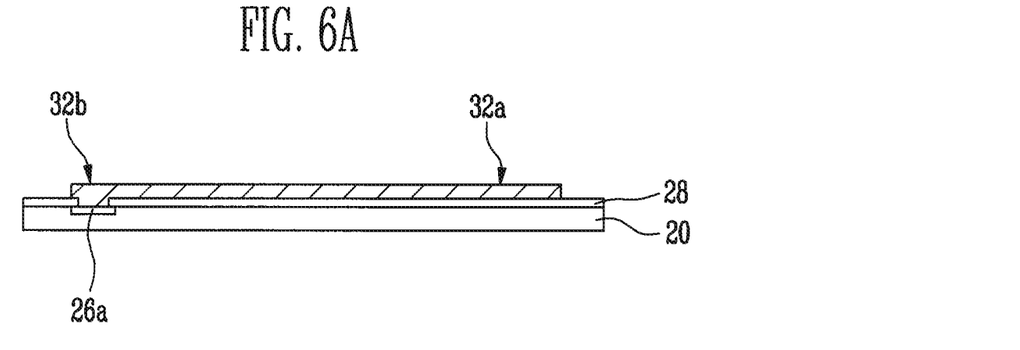
FIGS. 6A to 6C are sectional views taken along line I1-I11 of FIGS. 5A to 5C, respectively.

Referring to FIGS. 5A and 6A, the positive electrode layer 32, in one embodiment, is formed having, for example, a thickness of about 10 to 30 μm on the circuit board 20. The positive electrode layer 32, in one embodiment, includes an electrode portion 32a and a tab portion 32b protruded from the electrode portion 32a. The tab portion 32b, in one embodiment, is connected to the exposed pad portion 26a, so that the positive electrode layer 32 is connected to the circuit board 20.

In one embodiment, the positive electrode layer 32 may be formed of a positive electrode active material, such as using a spray, coating, or deposition method. In one embodiment, lithium-based oxides, such as lithium cobalt oxide ($LiCoO_2$), lithium nickel oxide ($LiNiO_2$), and lithium manganese oxide ($LiMn_2O_4$) may be used as the positive electrode active material. In one embodiment, a binder and/or a conducting material may be mixed with the positive electrode active material.

In one embodiment, the positive electrode layer 32 does not include a positive electrode collector made of a metal such as aluminum (Al). Hence, in one embodiment, to provide sufficient conductivity, the conducting material may be mixed in the positive electrode active material at a rate of about 10% or higher (e.g., in a ratio of about 10% to about 40%).

Figure 6B:
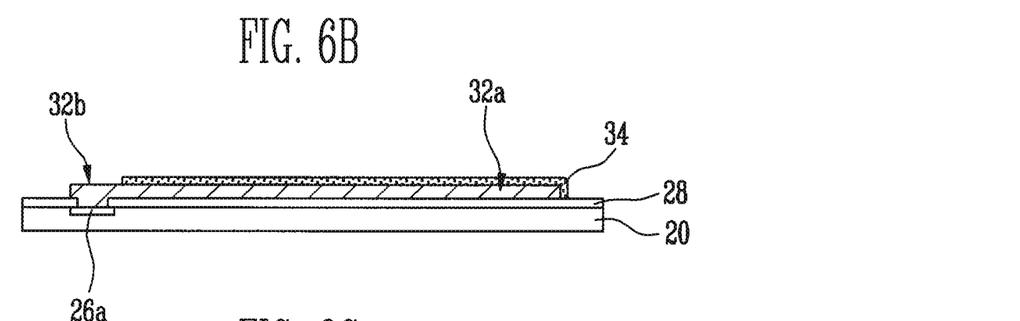

Referring to FIGS. 5B and 6B, the separator 34, in one embodiment, is formed having, for example, a thickness of about 3 to 10 μm on the positive electrode layer 32. In one embodiment, to prevent or substantially prevent a short circuit between the positive and negative electrode layers 32 and 36, the width of the separator 34 is formed wider than that of the positive electrode layer 32, such as surrounding sidewalls of the electrode portion 32a of the positive electrode layer 32.

The separator 34, in one embodiment, includes a porous insulating material through which lithium ions can pass. The separator 34 may be formed with a fiber non-woven fabric, including resin such as polyethylene, polypropylene, polyolefin, a mixture thereof, or one or more selected from the group consisting of cellulose, polyester, and polypropylene.

An EC-based or PC-based electrolyte may be contained in the separator 34. For example, an electrolyte may be penetrated into the separator 34 by dipping the separator 34 in the electrolyte.

Figure 6C:
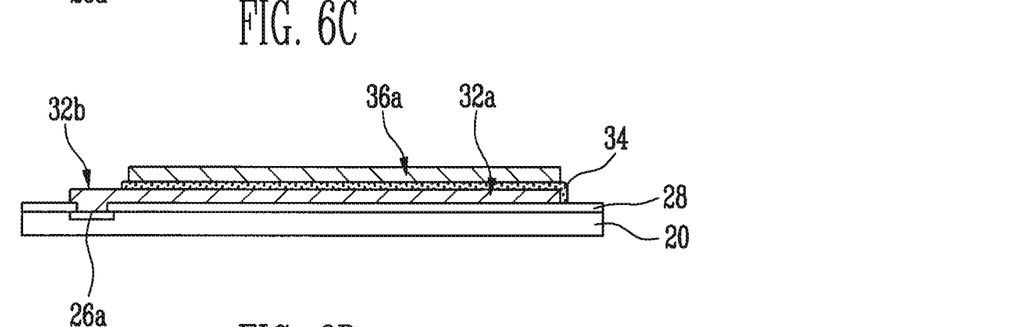
Figure 6D:
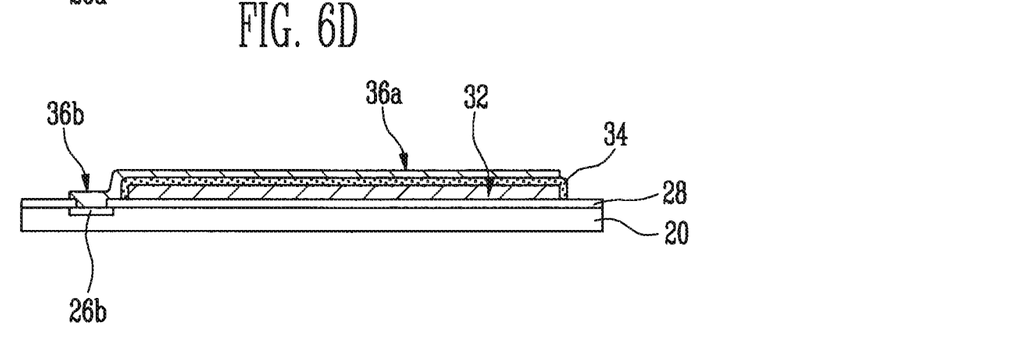
FIG. 6D is a sectional view taken along line I2-I22 of FIG. 5C.

Referring to FIGS. 5C, 6C and 6D, the negative electrode layer 36, in one embodiment, is formed having, for example, a thickness of about 10 to 30 μm on the separator 34. The negative electrode layer 36, in one embodiment, includes an electrode portion 36a and a tab portion 36b protruded from the electrode portion 36a. The tab portion 36b, in one embodiment, is connected to the exposed pad portion 26b, so that the negative electrode layer 36 is connected to the circuit board 20. In one embodiment, the electrode portion 36a of the negative electrode layer 36 is disposed to overlap with the electrode portion 32a of the positive electrode layer 32. The tab portion 36b of the negative electrode layer 36 is disposed at a different position from that of the tab portion 32b of the positive electrode layer 32 and does not overlap with the tab portion 32b of the positive electrode layer 32. That is, at the portion taken along line I1-I11 of FIG. 5C, the tab portion 32b of the positive electrode layer 32 is exposed, as illustrated in FIG. 6C. At the portion taken along line I2-I22 of FIG. 5C, the electrode portion 36a of the negative electrode layer 36 is exposed, as illustrated in FIG. 6D.

The negative electrode layer 36, in one embodiment, may be formed of a negative electrode active material, such as using a spray, coating, or deposition method. In one embodiment, coke-based or graphite-based carbon may be used as the negative electrode active material. In one embodiment, a binder and/or a conducting material may be mixed with the negative electrode active material.

Figure 7:
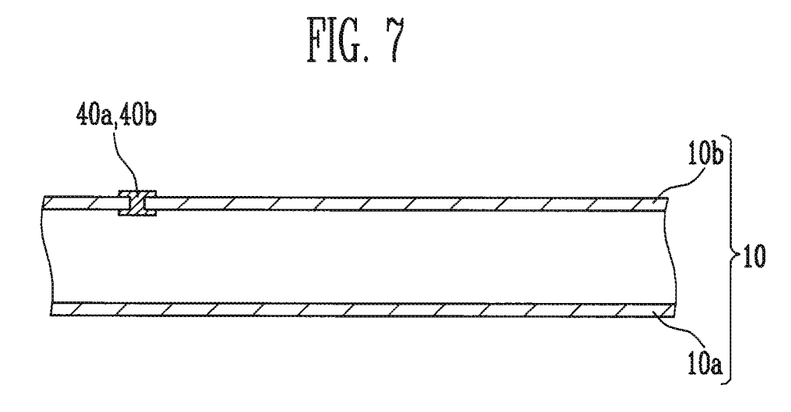
FIG. 7 is a sectional view of a case of the secondary battery of FIG. 2.

Referring to FIGS. 2 and 7, in one embodiment, the case 10 includes a lower plate 10a and an upper plate 10b. The case 10, in one embodiment, is formed in the shape of a thin film in which the lower and upper plates 10a and 10b are connected to each other. Terminals 40a and 40b are formed at either one of the lower and upper plates 10a and 10b (e.g., at the upper plate 10b). In one embodiment, as shown in FIG. 7, each of the terminals 40a and 40b allows the inner and outer surfaces of the upper plate 10b to be electrically connected to each other through a hole passing through the upper plate 10b. The terminals 40a and 40b are formed to correspond to the tab portion 32b of the positive electrode layer 32 and the tab portion 36b of the negative electrode layer 36, respectively.

The case 10, in one embodiment, is made of a flexible resin which may include a synthetic resin such as nylon, polyvinyl chloride (PVC), polyethylene, acrylonitrile butadiene styrene (ABS), polyethylene terephthalate (PET), polyethylene terephthalate-G (PET-G), and Teflon® (polytetrafluoroethylene, PTFE). The case 10 may be formed into a single-layered or multi-layered structure of a film made of a synthetic resin or a multi-layered structure of a film made of a synthetic resin and a metal thin film such as aluminum.

Figure 8:
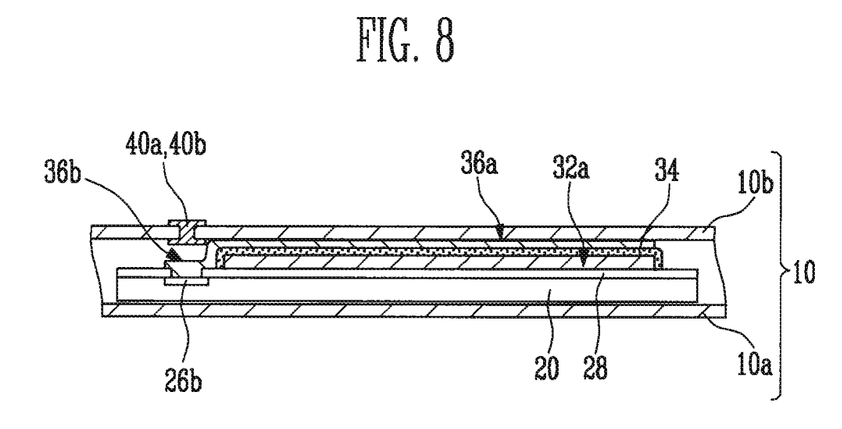
FIG. 8 is a sectional view of the secondary battery of FIG. 2.
Figure 9:
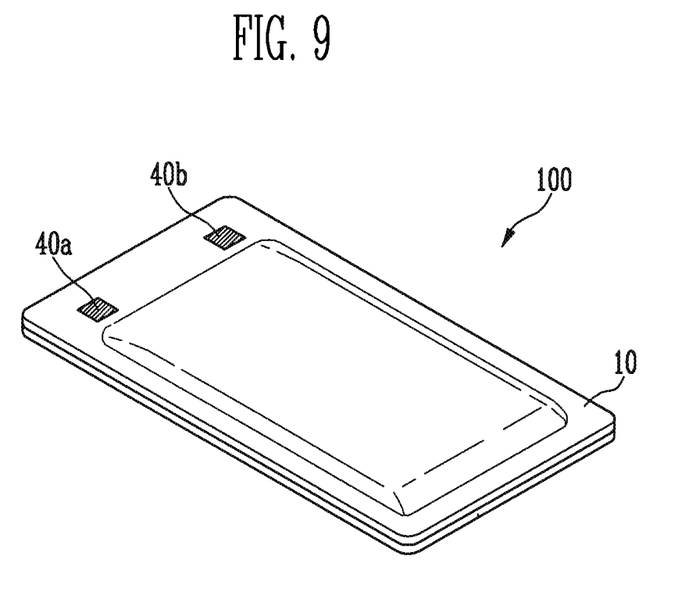
FIG. 9 is a perspective view of the secondary battery of FIG. 2.

Referring to FIG. 8, in one embodiment, in a state that a stacked assembly of the circuit board 20, the positive electrode layer 32, the separator 34, and the negative electrode layer 36 is interposed between the lower and upper plates 10a and 10b, edge portions of the lower and upper plates 10a and 10b are joined with each other using a method such as heat compression, so that the stacked assembly is sealed as illustrated in FIG. 9. In one embodiment, the tab portion 32b of the positive electrode layer 32 and the tab portion 36b of the negative electrode layer 36 are respectively connected by compression to the terminals 40a and 40b of the upper plate 10b that are exposed to the exterior of the case 10. That is, in one embodiment, the terminals 40a and 40b exposed to the exterior of the case 10 are respectively connected to the tab portion 32b of the positive electrode layer 32 and the tab portion 36b of the negative electrode layer 36, thereby charging and discharging a secondary battery.

An aspect of embodiments of the present invention provides a smart card having a secondary battery, so that information storage and processing are performed in the smart card itself. Accordingly, the smart card can be applied to various fields and uses. For example, the smart card may be used as a cash card, a credit card, a point card, an electronic money card, a pass card, an identification (ID) card, or the like.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
a circuit board comprising a first connection pad on a first surface of a substrate, and a second connection pad on the first surface of the substrate, a circuit interconnection extending along on the first surface of the substrate and electrically connected to the first and second connection pads, and an integrated circuit on the first surface of the substrate and electrically connected to the first and second connection pads through the circuit interconnection, both the first and second connection pads being spaced apart from the integrated circuit in a first direction, the integrated circuit being electrically connected to the first connection pad through a first portion of the circuit interconnection and electrically connected to the second connection pad through a second portion of the circuit interconnection;
at least one first electrode layer comprising a first electrode portion covering and surrounding the first portion of the circuit interconnection and overlapping the second portion of the circuit interconnection and covering an outer side of the integrated circuit such that a perimeter of the first electrode layer surrounds a perimeter of the integrated circuit, and a first tab portion connected to the first connection pad, the first electrode portion and the first tab portion being an integral layer directly contacting the first connection pad;
at least one second electrode layer comprising a second electrode portion covering and surrounding the second portion of the circuit interconnection and overlapping the first portion of the circuit interconnection and covering the outer side of the integrated circuit such that a perimeter of the second electrode layer surrounds the perimeter of the integrated circuit, and a second tab portion connected to the second connection pad, the second electrode portion and the second tab portion being an integral layer directly contacting the second connection pad; and
a separator covering the first electrode portion and disposed between the first electrode portion and the second electrode portion, the separator overlapping the first and second portions of the circuit interconnection and covering the outer side of the integrated circuit such that a perimeter of the separator surrounds the perimeter of the integrated circuit,
wherein a stacked assembly comprising the first electrode layer, the separator, and the second electrode layer is stacked in a stacking direction perpendicular to the first direction on the integrated circuit and a first surface of the circuit board, and
wherein the at least one second electrode layer does not overlap the first tab portion.

2. The secondary battery of claim 1, wherein the circuit board functions as a case at a first side of the secondary battery.

3. The secondary battery of claim 1, further comprising a case containing the circuit board, the first electrode layer, the separator, and the second electrode layer.

4. The secondary battery of claim 3, wherein the case comprises a first portion on a first side of the circuit board and a second portion on a second side of the circuit board opposite the first side, wherein the first and second portions are coupled to one another at respective edge portions thereof for sealing the case.

5. The secondary battery of claim 3, wherein the case comprises a flexible resin.

6. The secondary battery of claim 3, further comprising first and second terminals connected to the first and second electrode layers, respectively, proximate the respective first and second connection pads, the first and second terminals being exposed outside the case.

7. The secondary battery of claim 1, wherein the circuit board comprises a flexible printed circuit board (FPCB).

8. The secondary battery of claim 1, further comprising an insulating film or an insulating layer on an outer surface of the second electrode layer.

9. The secondary battery of claim 8, wherein the insulating film or the insulating layer seals sides of the circuit board.

10. The secondary battery of claim 1, further comprising a cover plate on the second electrode layer.

11. The secondary battery of claim 10, wherein the cover plate seals sides of the circuit board.

12. The secondary battery of claim 1, wherein the circuit board further comprises a protection layer on the first surface of the circuit board, and the first and second tab portions are connected to the first and second connection pads, respectively, through first and second openings through the protection layer.

13. The secondary battery of claim 12, wherein the protection layer coats the first surface of the circuit board other than the first and second openings.

14. The secondary battery of claim 12, wherein the circuit board further comprises an insulating film or an insulating layer on a second surface of the circuit board opposite the first surface of the circuit board.

15. The secondary battery of claim 1, wherein the integrated circuit comprises a storage unit configured to store information, a receiving unit configured to receive input signals, a transmitting unit configured to transmit output signals, and a processing unit configured to process signals.

16. The secondary battery of claim 1, wherein the second electrode portion overlaps the first electrode portion.

17. The secondary battery of claim 1, wherein the separator has a width that is greater than a corresponding width of the first electrode layer.

18. A smart card comprising:
a circuit board comprising a first connection pad on a first surface of a substrate, and a second connection pad on the first surface of the substrate, a circuit interconnection extending along on the first surface of the substrate and electrically connected to the first and second connection pads, and an integrated circuit on the first surface of the substrate and electrically connected to the first and second connection pads through the circuit interconnection, both the first and second connection pads being spaced apart from the integrated circuit in a first direction, the integrated circuit being electrically connected to the first connection pad through a first portion of the circuit interconnection and electrically connected to the second connection pad through a second portion of the circuit interconnection;
at least one first electrode layer comprising a first electrode portion covering and surrounding the first portion of the circuit interconnection and overlapping the second portion of the circuit interconnection and covering an outer side of the integrated circuit such that a perimeter of the first electrode layer surrounds a perimeter of the integrated circuit, and a first tab portion connected to the first connection pad, the first electrode portion and the first tab portion being an integral layer directly contacting the first connection pad;

at least one second electrode layer comprising a second electrode portion covering and surrounding the second portion of the circuit interconnection and overlapping the first portion of the circuit interconnection and covering the outer side of the integrated circuit such that a perimeter of the second electrode layer surrounds the perimeter of the integrated circuit, and a second tab portion connected to the second connection pad, the second electrode portion and the second tab portion being an integral layer directly contacting the second connection pad;

a separator covering the first electrode portion and disposed between the first electrode portion and the second electrode portion, the separator overlapping the first and second portions of the circuit interconnection and covering the outer side of the integrated circuit such that a perimeter of the separator surrounds the perimeter of the integrated circuit; and a case containing the circuit board, the first electrode layer, the separator, and the second electrode layer, wherein a stacked assembly comprising the first electrode layer, the separator, and the second electrode layer is stacked in a stacking direction perpendicular to the first direction on the integrated circuit and a first surface of the circuit board, wherein the at least one second electrode layer does not overlap the first tab portion, and wherein the integrated circuit comprises a storage unit configured to store information, a receiving unit configured to receive input signals, a transmitting unit configured to transmit output signals, and a processing unit configured to process signals.

\* \* \* \* \*